United States Patent
Altieri

(10) Patent No.: US 7,353,779 B2
(45) Date of Patent: Apr. 8, 2008

(54) K-9 RAPPEL HARNESS SYSTEM

(75) Inventor: David P. Altieri, Woodland Park, CO (US)

(73) Assignee: Tech Vets, Inc., Woodland Park, CO (US)

( * ) Notice: Subject to any disclaimer, the term of this patent is extended or adjusted under 35 U.S.C. 154(b) by 316 days.

(21) Appl. No.: 11/182,304

(22) Filed: Jul. 18, 2005

(65) Prior Publication Data

US 2007/0012261 A1   Jan. 18, 2007

(51) Int. Cl.
*A01K 29/00* (2006.01)
*A45F 3/04* (2006.01)

(52) U.S. Cl. .................. 119/770; 224/160; 119/856

(58) Field of Classification Search .............. 119/770, 119/769, 792, 856, 771; 2/44, 45, 311; 182/3, 182/4, 5; 224/158, 159, 160, 600, 625, 627, 224/641; 441/80
See application file for complete search history.

(56) References Cited

U.S. PATENT DOCUMENTS

| | | | | |
|---|---|---|---|---|
| 1,162,662 A * | 11/1915 | Sprong | ................. | 224/160 |
| 1,307,597 A * | 6/1919 | Orloff | ................. | 224/575 |
| 1,518,830 A * | 12/1924 | Woods | ................. | 224/160 |
| 2,212,746 A * | 8/1940 | Nunn | ................. | 119/770 |
| 4,746,084 A * | 5/1988 | Strong | ................. | 244/151 R |
| 5,076,598 A * | 12/1991 | Nauman | ................. | 280/202 |
| 5,148,956 A * | 9/1992 | Funk | ................. | 224/576 |
| 5,277,348 A * | 1/1994 | Reid | ................. | 244/151 R |
| 5,531,187 A * | 7/1996 | Ward | ................. | 119/856 |
| 5,941,199 A * | 8/1999 | Tamura | ................. | 119/850 |
| 6,101,979 A * | 8/2000 | Wilson et al. | ................. | 119/725 |
| 6,123,049 A * | 9/2000 | Slater | ................. | 119/850 |
| 6,651,594 B1 * | 11/2003 | Bagwell | ................. | 119/770 |
| 6,802,282 B2 * | 10/2004 | Muckleroy | ................. | 119/497 |
| 6,866,173 B2 * | 3/2005 | Haber | ................. | 224/160 |
| 7,017,525 B2 * | 3/2006 | Leach | ................. | 119/770 |
| 2004/0031827 A1 * | 2/2004 | Haber | ................. | 224/160 |
| 2006/0195962 A1 * | 9/2006 | Jordan | ................. | 2/69 |
| 2006/0254533 A1 * | 11/2006 | Fuller et al. | ................. | 119/770 |

* cited by examiner

*Primary Examiner*—Yvonne R. Abbott
(74) *Attorney, Agent, or Firm*—Richard W. Hanes; January D. Barrett; Hanes & Schutz, LLC

(57) ABSTRACT

A harness system for interconnecting canine and human members comprising a human harness having interconnected webbing and belt members for embracing the body of a human being, a canine harness having interconnected webbing members adapted to embrace and support the body of a dog and releasable buckles, connectors and straps for interconnecting the human harness and the canine harness in a manner that juxtaposes the dog against the back of the human being for rappelling activity.

10 Claims, 12 Drawing Sheets

K-9 RAPPEL HARNESS SYSTEM

FIELD OF THE INVENTION

The present invention relates to a harness system that will enable a handler and a working dog to rappel together from a helicopter or cliff.

BACKGROUND OF THE INVENTION

In many different settings working dogs and their handlers are required to jump, rappel or ascend as a unit. These activities routinely occur in military operations, border patrols, police work, mountain climbing, search and rescue and other pursuits where working dogs must accompany their handlers while descending from buildings, cliffs or helicopters and on some occasions making the reverse ascent. Traditionally a vest or straight jacket with attachment devices is fitted to the dog with one or more straps interconnecting the dog and the handler. Various arrangements for positioning the dog vis-à-vis the handler have been devised including an arrangement where the dog is between the legs of the handler and one where the dog is next to the abdomen of the handler. These systems suffer from several severe problems. The existing systems do not secure the dog to the handler in a fashion that keeps them in a fixed position with respect to one another in the event that the handler is tipped, tilted or, in the extreme, turns upside down. Furthermore, prior art single point, or even double point, connections between dog and handler allow the dog to swing like a pendulum when rappelling. Such connections also leave the dog sufficient freedom of movement that it can make the handler unstable, especially when rappelling over a cliff where the dog can reach the terrain with its legs and feet. Such circumstances to not inspire the confidence and self assurance that is required of a working dog and also distract the handler from attention to his/her mission.

Accordingly, it is the primary object of the present invention to provide a harness system for interconnecting a dog and handler that will secure the dog to the handler's back in such a manner that their positions with respect to one another will remain fixed regardless of the attitude, position or orientation of the handler.

Another object of the invention is to provide a harness system where, upon completing the descent, the dog can be readily detached from the back of the handler without another's assistance and each can be ready for his respective working assignment without having to remove the individual harness from either the dog or the handler.

A further object of the invention is to provide a harness system that will secure a dog to a handler is such a manner that the dog will not have the freedom of movement to create instability of the handler.

A still further object of the invention is to provide a system whereby neither dog nor handler are fatigued by maintaining the secure rappelling connection between them during the time a transporting aircraft is traveling to the drop zone. According to the invention the dog can be loosely connected to the handler with some freedom of movement, including standing, pending arrival over the working area. After reaching the rappel point, with one hand of the handler, the dog can be quickly pulled in close and locked tightly against the handler's back for the "rappel ready" position.

Other and further objects, features and advantages of the present invention will become apparent upon a reading of the following description of a preferred form of the invention taken in conjunction with the accompanying drawings.

SUMMARY OF THE INVENTION

The present invention is a harness system for securing a dog to the back of a human handler for rappelling operations. The system includes a human harness comprising interconnected webbing members embracing the handler's upper body and seat, a canine harness comprising interconnected webbing members embracing and supporting the body of a dog, and releasable connectors for interconnecting the human harness and the canine harness. The system of the invention features a four point hook-up between the two harnesses that maintains the dog in its position on the back of the handler regardless of the orientation of the handler.

As part of the four point hook-up, the system includes two quickly releasable over the shoulder riser connections between the harnesses of the handler and the dog and two waist area flexible drawstring type connectors between the respective harnesses. When pulled tight by the handler, the drawstring connectors bring the dog close in against the handler's back. All four of the connections may easily be disconnected by the handler when he or she is "off rappel."

DETAILED DESCRIPTION OF PREFERRED EMBODIMENT

Figure 1:
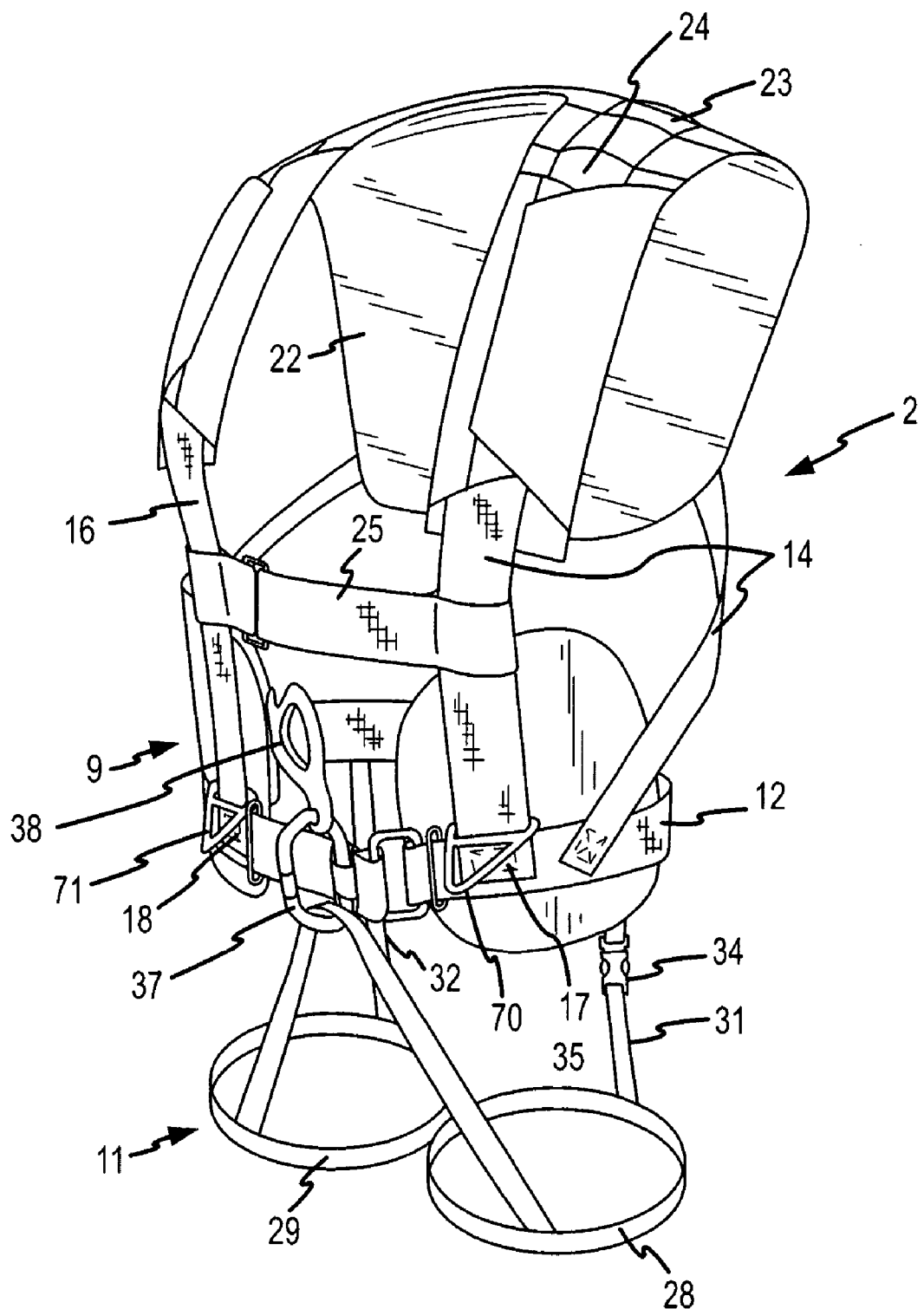
FIG. 1 is a front quarter perspective view of the human harness of the present invention.
Figure 2:
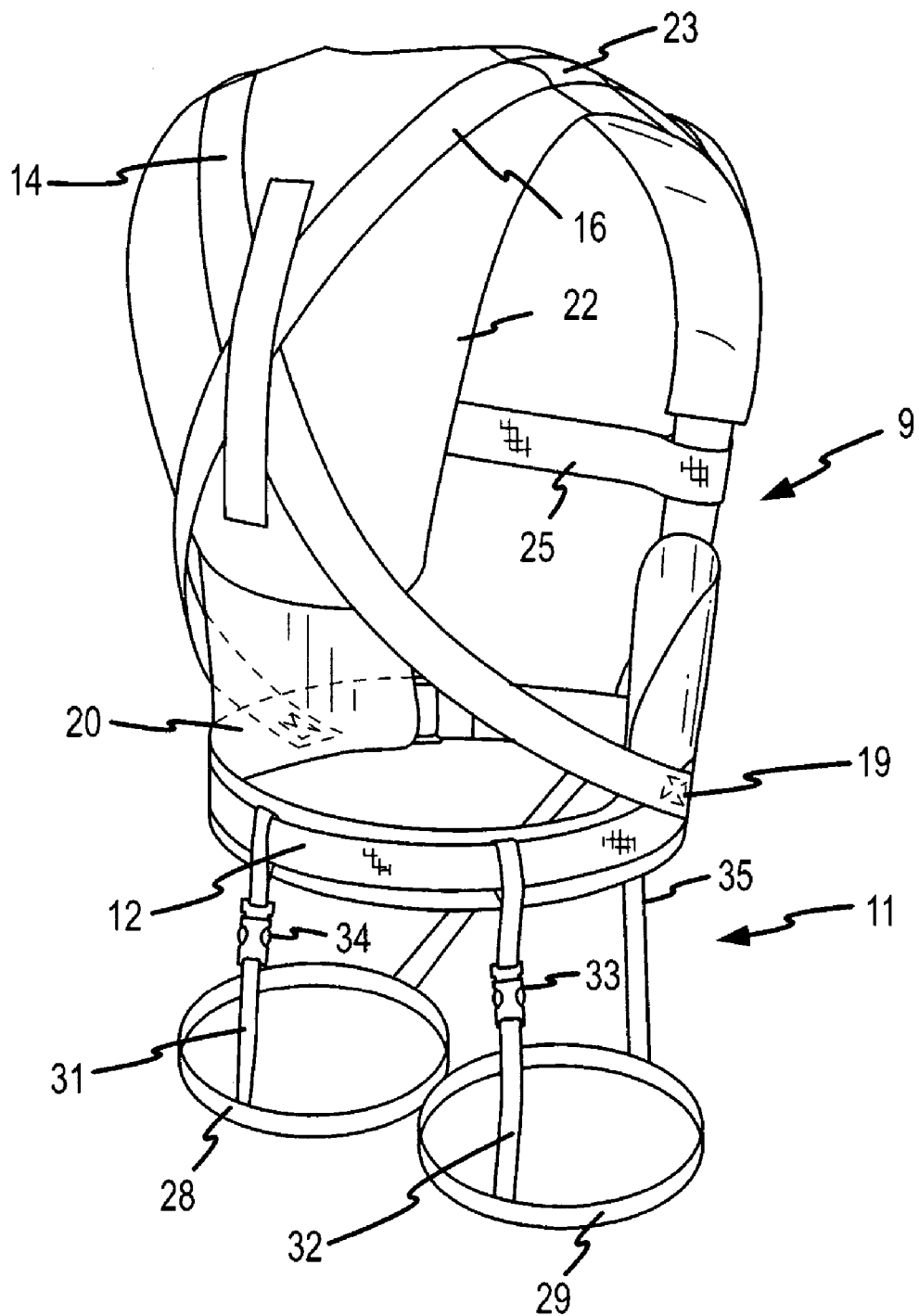
FIG. 2 is a rear quarter perspective view of the human harness.
Figure 3:
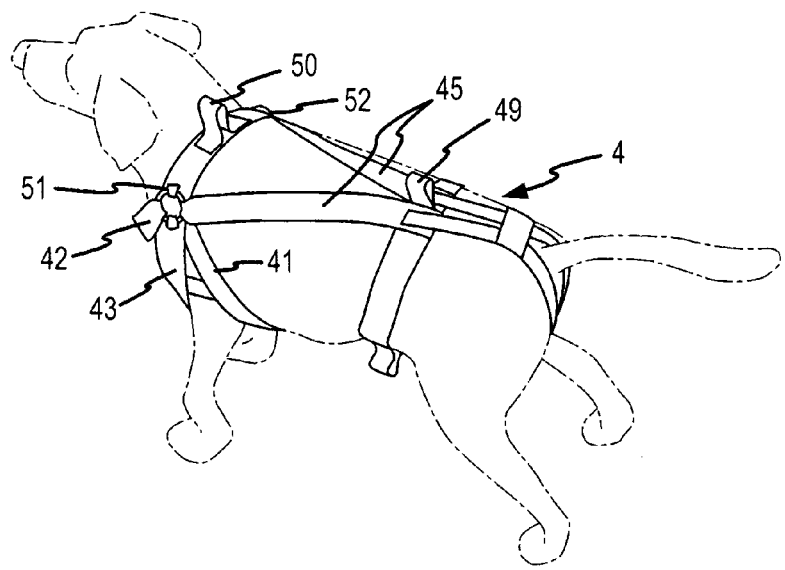
FIG. 3 is top perspective view of the canine harness of the present invention.
Figure 4:
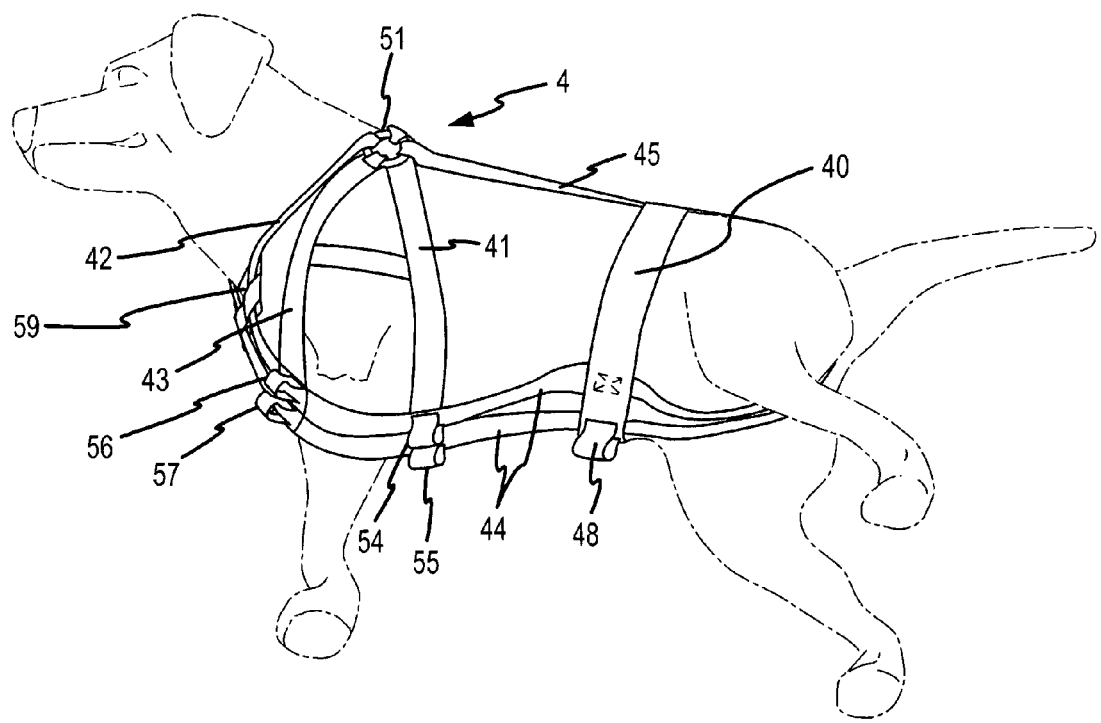
FIG. 4 is a bottom perspective view of the canine harness.

The basic components of the system of the present invention are a handler harness 2 (FIGS. 1 and 2), a canine harness 4 (FIGS. 3 and 4) and upper and lower coupling assemblies 6 and 8 (FIGS. 5 and 6) that couple the handler and canine harnesses together.

The dog handler's harness 2 comprises an upper body portion 9 and a seat portion 11 that are interconnected by separate attachments to a common waist belt 12. The upper body portion of the handler's harness is similar in many respects to the upper body portion of a parachute harness. Flat high strength webbing forms a pair of shoulder straps 14 and 16 that conform to the shoulders of the handler. The anterior portions of the shoulder straps drop from the shoulder area to spaced apart points 17 and 18 where the straps are permanently attachment to the front of the waist belt 12. Posteriorly, the shoulder straps criss-cross over the wearer's back and depend angularly across the kidney area of the abdomen to respective attachment points 19 and 20 on the lateral sides of the waist belt. Positioned beneath the crossed shoulder straps, a suitable pad 22 covers the thoracic back area of the handler. From that central back area the pad extends up over the shoulders and anteriorly down across the chest and abdomen beneath the shoulder straps 14 and 16. In order to provide a protective cushion for the shoulder straps the pad is made of greater width than the shoulder straps. The extra width of the pad serves as a mounting for laterally extending retainer loops 23 and 24 that encase each shoulder strap to prevent its lateral excursion toward the neck or off of the shoulder of the handler. The ends of a floating laterally extending chest strap 25 are slidably attached to the respective right and left anterior lengths of the shoulder straps for maintaining a fixed distance between the anterior portions of the shoulder straps.

The seat portion of the harness resembles a traditional climbing harness, having a pair of leg straps 28 and 29 around the thigh portion of each leg that are interconnected to the waist belt 12. A pair of buttock straps 31 and 32 having disconnect buckles 33 and 34 interconnects the back of the leg straps with the rear portion of the waist belt. A single "V" shaped strap 35 interconnects points on the front of each leg strap and is supported at the crotch of the "V" by a seat harness carabiner 37 that is attached to the front center of the waist belt. Also carried by the waist belt is a pirana rappelling device 38 hooked into the seat harness carabiner 37 for securing a rappelling line 39 onto the handler. The primary purpose of the seat harness is to anchor the body harness and the waist belt against the upward pulling force of the rappel line.

The shoulder straps, the waist belt, the chest strap and the components of the seat harness are preferably equipped with adjustment buckles and extra lengths of the webbing material in order to provide harness adjustability for different sized wearers, however, in order to make the drawings simpler and easier to understand these state of the art refinements are not shown.

The illustrated canine harness 4 is designed for maximum comfort consistent with secure and constant positional support of a dog on the back of its handler, regardless of the body orientation of the handler. To this end the canine harness comprises a loin girth 40, a brisket girth 41, upper and lower chest straps 42 and 43 and longitudinal belly and back straps 44 and 45. Diametrically opposed carabiner connection loops 48 and 49 are provided at the point on the dog's belly where the longitudinal belly straps are connected to the loin girth and at the point over the dog's back where the longitudinal back straps are connected to the loin girth. A second back carabiner attachment loop 50 is positioned over the withers of the dog and attached to the harness webbing between two shoulder rings 51 and 52 that provide floating connection points for the terminal ends of the brisket girth and the upper and lower chest straps. Right and left brisket attachment loops 54 and 55 are provided at the location of a sliding connection between the brisket girth 41 and the two longitudinal belly straps 44. Alternative attachment loops 56 and 57 are provided just forward of the forelimbs of the dog at the intersection of the floating connections between the belly straps 44 and the lower chest strap 43. Longitudinal belly straps are held in a converging position over the dog's chest by a padded chest plate 59 that carries lateral extending loops that encircle the longitudinal belly straps and allow them some movement within the chest plate.

Figure 5:
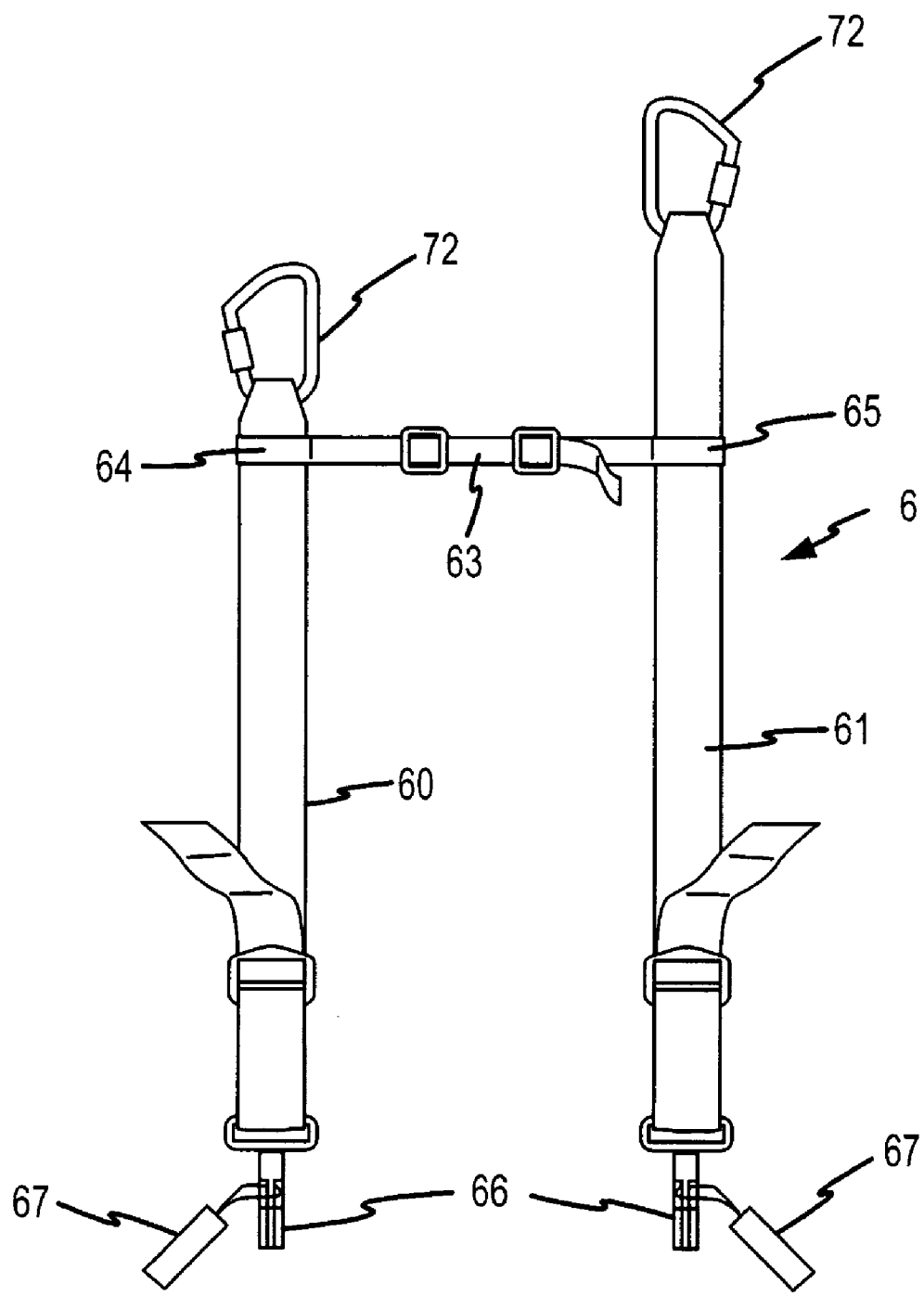
FIG. 5 is a plan view of the upper coupling assembly.

The upper coupling assembly is separately illustrated in FIG. 5. This component of the system establishes two of the four attachment points between the harnesses of handler and the dog. This assembly comprises a pair of mutually parallel spaced apart riser straps 60 and 61 interconnected by a stabilizer strap 63 that is provided with terminal end loops 64 and 65 that encircle the respective risers to allow sliding movement of the risers within the looped ends of the stabilizer strap 63. The stabilizer strap is intended to lie over and traverse the upper thoracic spine of the wearer. The anterior end of each riser is equipped with quick ejector snap 66 with a pull handle 67 and adapted to be operatively connected to a pair of spaced apart triangle rings 70 and 71 secured to the front of the handler's waist belt 12. The posterior end of each riser is provided with a carabiner connection loop 72 for attachment to the back connection loops 49 and 50 of the canine harness.

Figure 7:
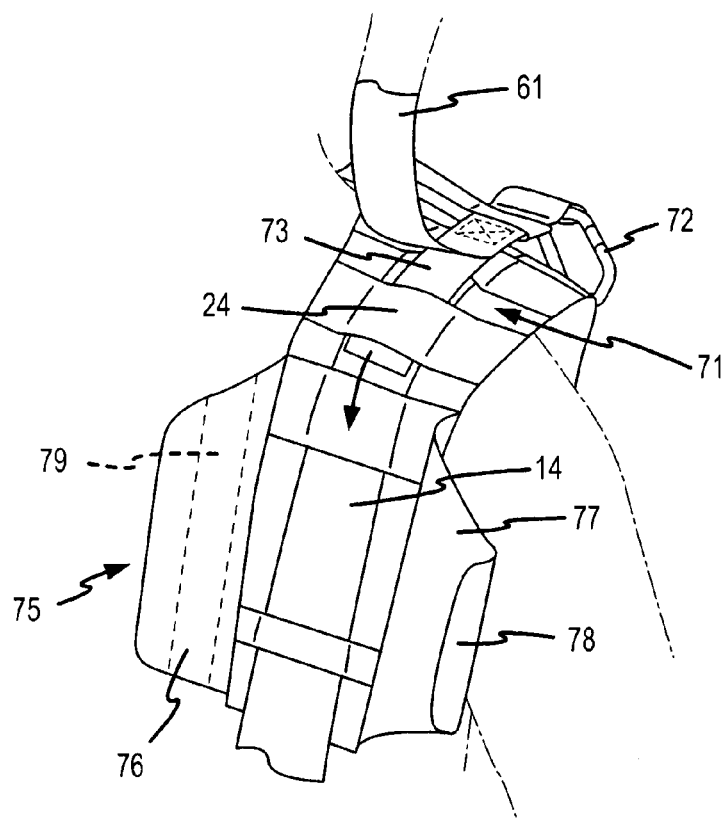
FIG. 7 is a fragmentary perspective view that is typical of the two retainer mechanisms on both the right and left of the harness for maintaining the riser straps of the upper coupling assembly on top of the respective shoulder straps of the human harness, namely the upper tuck tab and the lower sleeve pocket. The upper tuck tab is shown with the riser lifted to reveal the construction of the tab. The sleeve pocket is shown in its open position.
Figure 8:
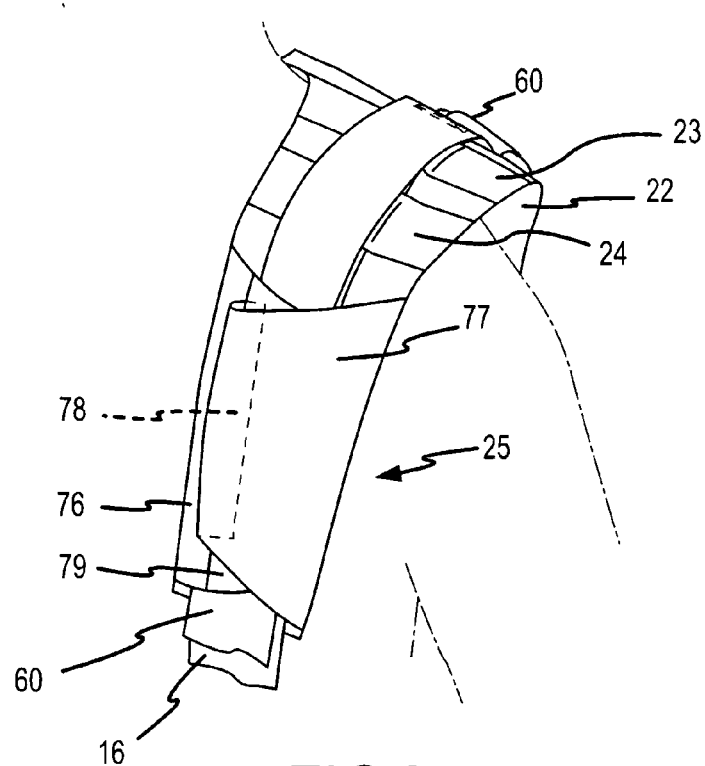
FIG. 8 is a fragmentary view of the left side of the harness with the retainer straps in their position over the shoulder straps and the retainer sleeve pocket in its closed position.

When united with the upper body harness, the over the shoulder risers 60 and 61 lie next to and over the upper body harness shoulder straps 16 and 14. Each riser is maintained in its position over the respective shoulder strap by two retaining devices. The first retainer is a tuck tab 71 illustrated in FIG. 7. It is formed by folding the posterior end of the riser strap 60 through its carabiner 72 and back upon itself and sewing the folded end in fixed position but allowing several inches of the folded riser to form a stub end 73 for insertion under one of the lateral shoulder strap retaining loops 24. In view of the substantial lateral rigidity of the webbing that forms the risers, the engagement of the stub end through the retainer loop 24 acts to keep the riser from migrating off of the shoulder strap 14. A second riser retaining device illustrated in FIGS. 7 and 8 comprises a sleeve forming pocket 75 mounted on the anterior portion of the shoulder strap 14 over the handler's chest. The sleeve pocket includes two opposed flaps 76 and 77 the sides of which are anchored to the respective lateral edges of a shoulder strap 14 and are adapted to folded over each other to enclose a portion of the anterior aspect of the riser strap 60. The pocket is secured in a closed position (FIG. 8) with another tuck tab formed by the extreme end 78 of the first one of the flaps 77 which is tailored to be tucked under a longitudinal retainer loop 79 mounted on the back side of the second flap 76.

Figure 6:
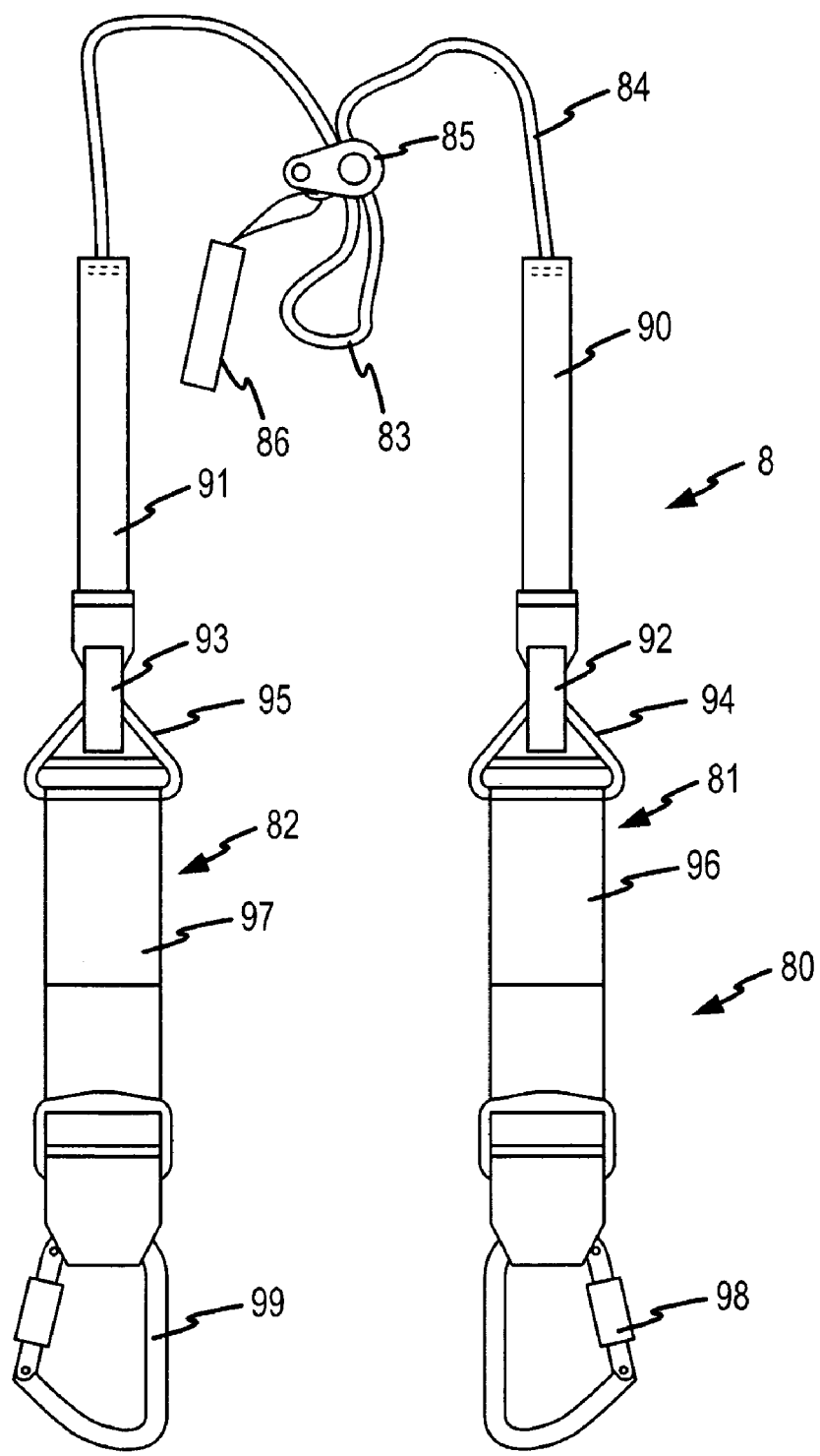
FIG. 6 is a plan view of the lower coupling assembly.

The lower coupling assembly 80 comprising the lower cinching connectors 81 and 82 is independently shown in FIG. 6. These connectors establish the other two of the four attachment points between the handler's harness 2 and the canine harness 4. The folded mid-point 83 of a length of five millimeter perlon cord 84 is disposed between the clamping jaws of a climbing appliance 85 commonly known as a ropeman locking device. The locking device is loosely attached to the front of the waist belt 12 by a carabiner 86 (See FIG. 9). The doubled strand of peprlon cord that emerges from the out side of the ropeman locking device serves as a grip 87 with which the handler can cinch the connectors 81 and 82 tight, as will be more fully explained below. When the cord is pulled through the ropeman device by the grip 87 the locking device locks the cord in position. The jaws of the locking device are released by pulling on a release handle 86. Separate lengths of the perlon cord emerging from the jaws on the inside of the ropeman locking device are respectively trained through supporting loops 88 attached to the waist belt on either side of the center of the belt front. The distal ends of the perlon cord 84 are secured to the respective ends of variable length straps 90 and 91 whose other ends carry alligator snap connectors 92 and 93. The alligator snap connectors interact with triangular rings 94 and 95 secured to the first ends of short lengths of webbing whose second ends carry carabiners 98 and 99 that are intended to be attached to attachment loops on the canine harness 4.

Having described its basic components, the operation of the system will now be described in terms of a rappel from a helicopter 100. The canine harness 4 of the present invention is placed on a working dog 101. The handler 102 who is to rappel out of the helicopter with the dog on his back dons his harness 2 with the over the shoulder risers 60 and 61 secured by the snap connectors 66 to the waist belt 12 and with the retainers 71 and 75 in their secured state over the human harness shoulder straps 14 and 16 and with the cinching connectors 81 and 82 attached to the waist belt of the handler's harness. Sitting on the floor of the helicopter and assisted by another person, the posterior carabiners 72 carried by the distal ends of the over the shoulder risers 60 and 61 are attached to the attachment loops 49 and 50 on the back of the canine harness that has been placed on the dog. That is, the posterior riser carabiners are connected respectively to the loop 49 on the back side of the loin girth 40 and to the attachment loop 50 over the dog's withers. The dog's head should be higher than its hind quarters and accordingly the riser whose distal carabiner is attached to the canine loin attachment will have a greater effective length than the one attached to the withers loop.

Figure 9:
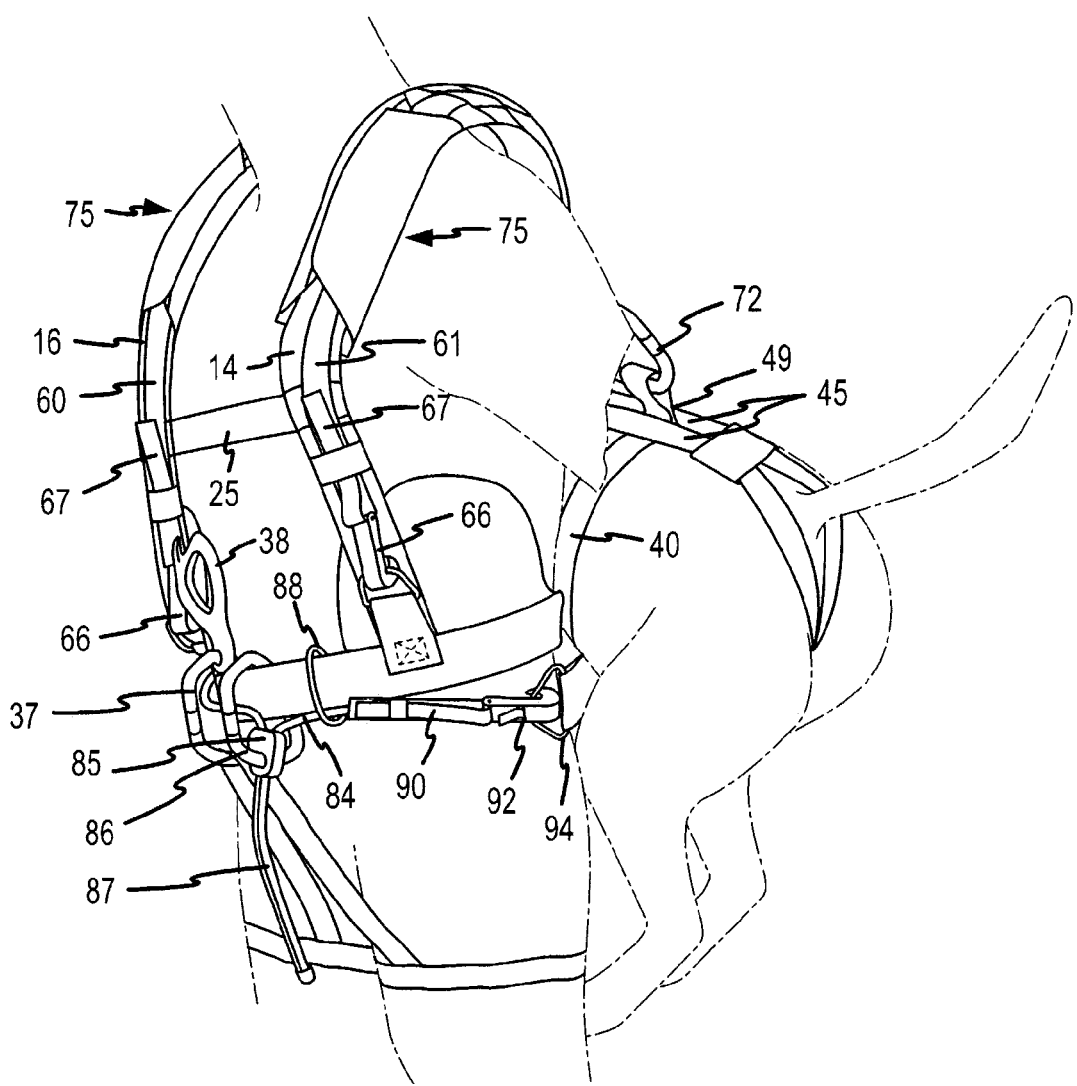
FIG. 9 is a perspective view of the harness system of the present invention in its fully connected position with the lower cinching connectors pulled tight so that the dog is secured against the back of the handler. The human handler and dog are shown in dotted lines.
Figure 13:
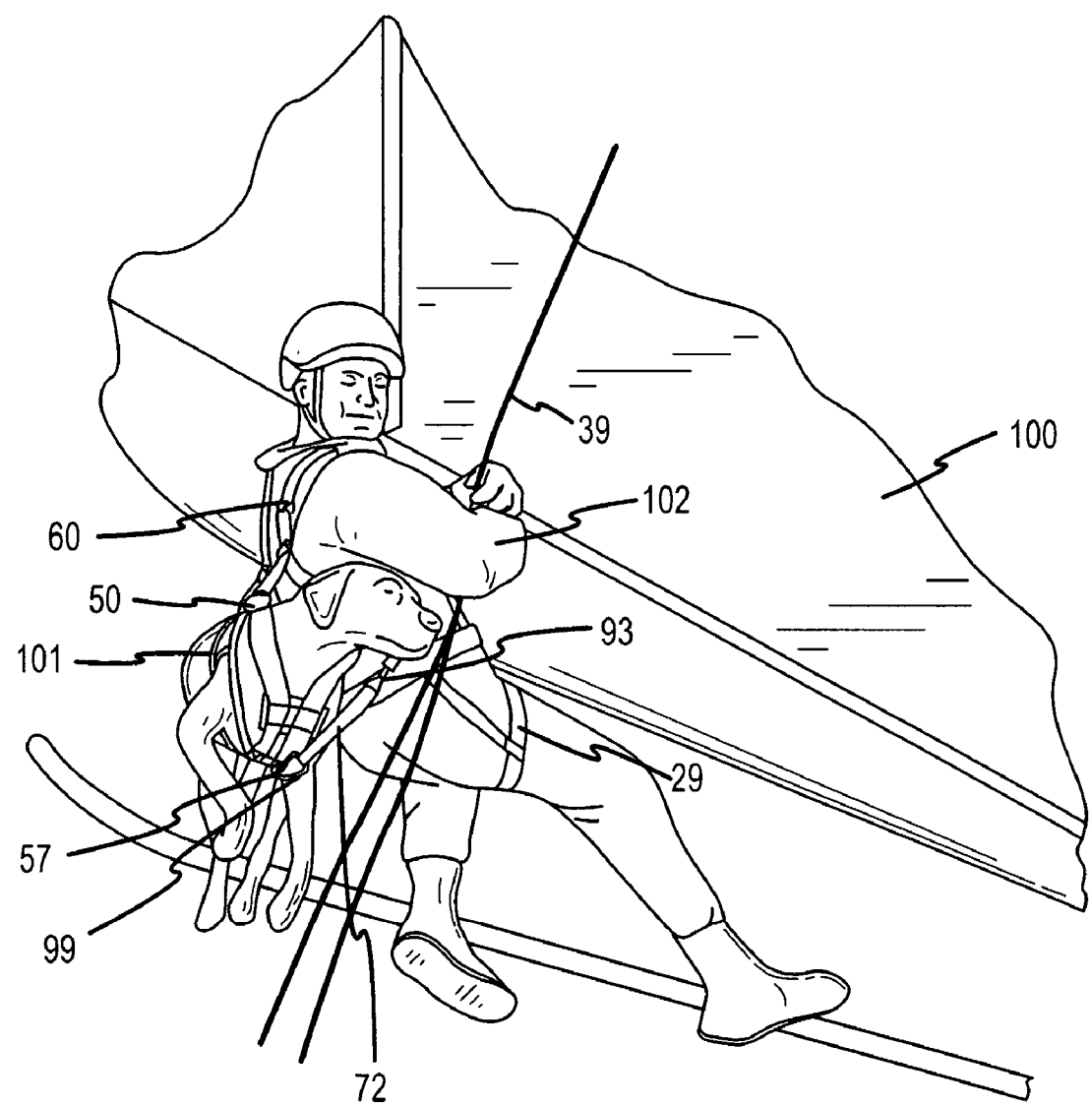
FIG. 13 is a perspective view of the handler emerging from a helicopter to begin the rappel with the working dog on his back.
Figure 14:
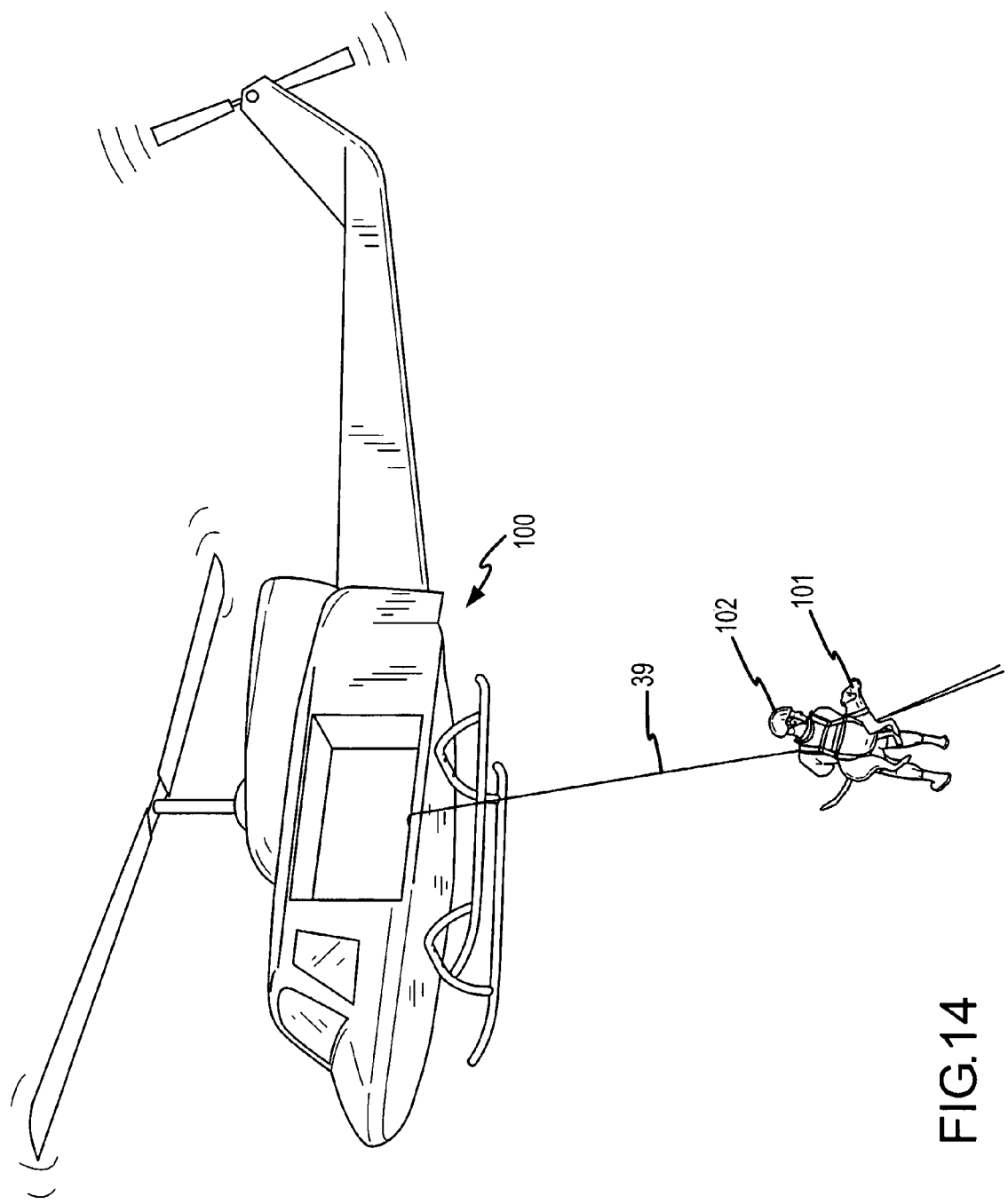
FIG. 14 is a lateral view of the handler and dog rappelling from the helicopter with the dog positively secured to the handler's back with the system of the present invention.

The next step is to attach the carabiners 98 and 99 carried by the distal ends of the lower coupling assembly's cinching connectors to other attachment points on the canine harness. One of the cinching connector carabiners is attached to the loop 48 on the belly side of the loin girth 40. Depending on the choice of the handler or the size or kind of dog, the second cinching connector carabiner is attached to either one of the loops 54 or 55 on the underside of the brisket girth 41 or to one of the loops 56 or 57 in front of the dog's forelimbs or to the shoulder ring 51 that is closest to the handler's back. These cinching connections are made with the cinching connectors 81 and 82 extended to their maximum length so that the dog is not pulled in close to the handler and is free to stand on the helicopter floor with a limited amount of freedom of movement pending the helicopter's arrival over the rappel location. When over the rappel location the handler, with the dog loosely attached to his back, takes a standing position on the skid of the helicopter facing inwardly toward the helicopter door and holding the rappel line 39 with one hand as a brake. Just prior to the rappel and with his free hand, the handler grips the double length grip section 87 of the perlon cord emerging from the outside of the ropeman locking device and pulls tension on the cord 84 and straps 90 and 91 and webbing lengths 96 and 97 to reduce their effective length on the back side of the ropeman device. Pulling the cinching connectors draws the dog in tightly against the back of the handler, as shown in FIG. 9. The ropeman locking device maintains the cords in their cinched-up position and locks the dog into a secure position against the back of the handler. The handler and dog are now firmly attached to one another and are ready to rappel from the helicopter with the dog out of the way of the handler's rappelling task, as shown in FIG. 13.

Figure 10:
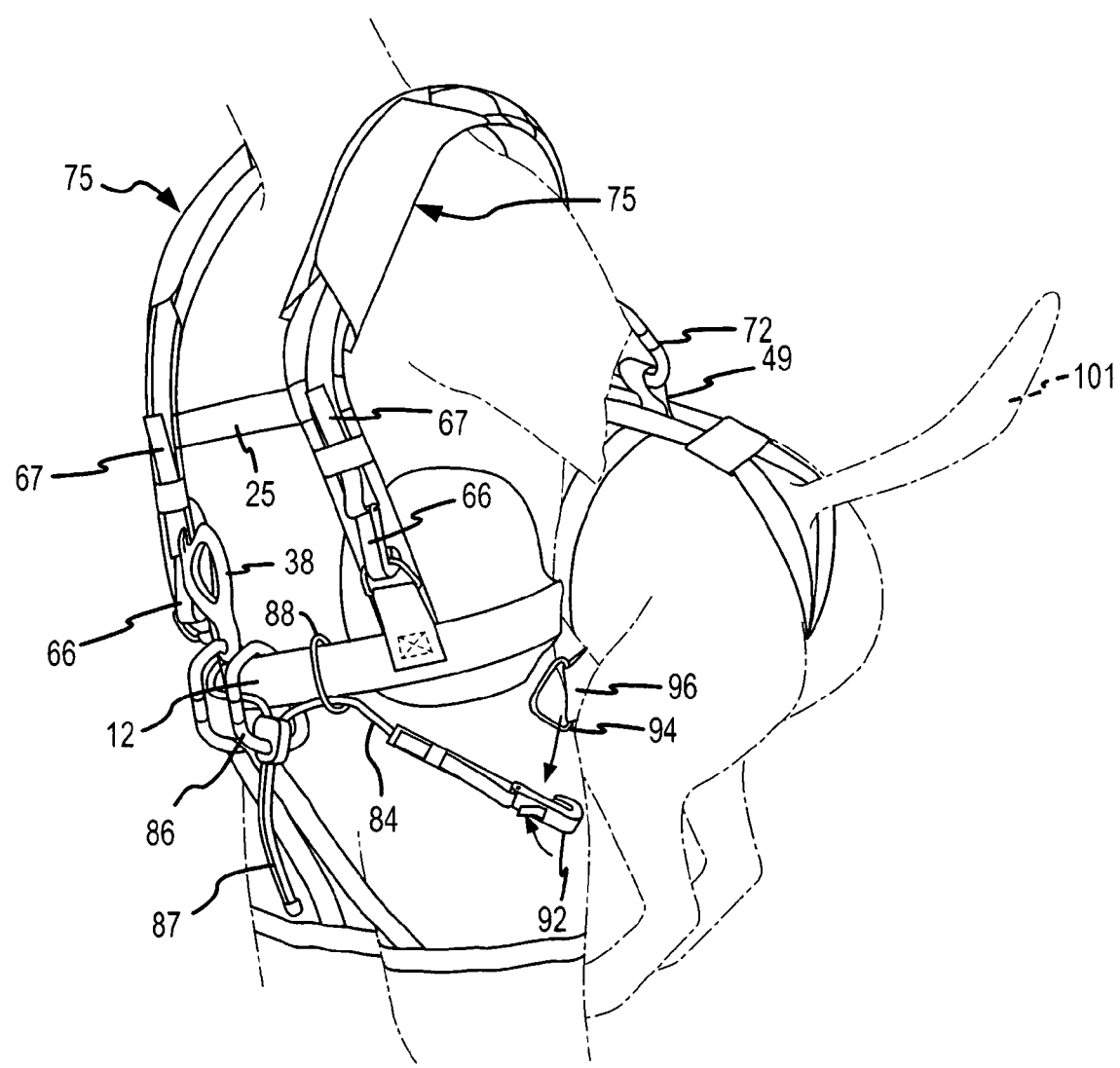
FIG. 10 is similar to FIG. 9 but showing the first step in disconnecting the dog from the handler, that is disconnecting the alligator clips on the cinching straps of the lower coupling assembly.
Figure 11:
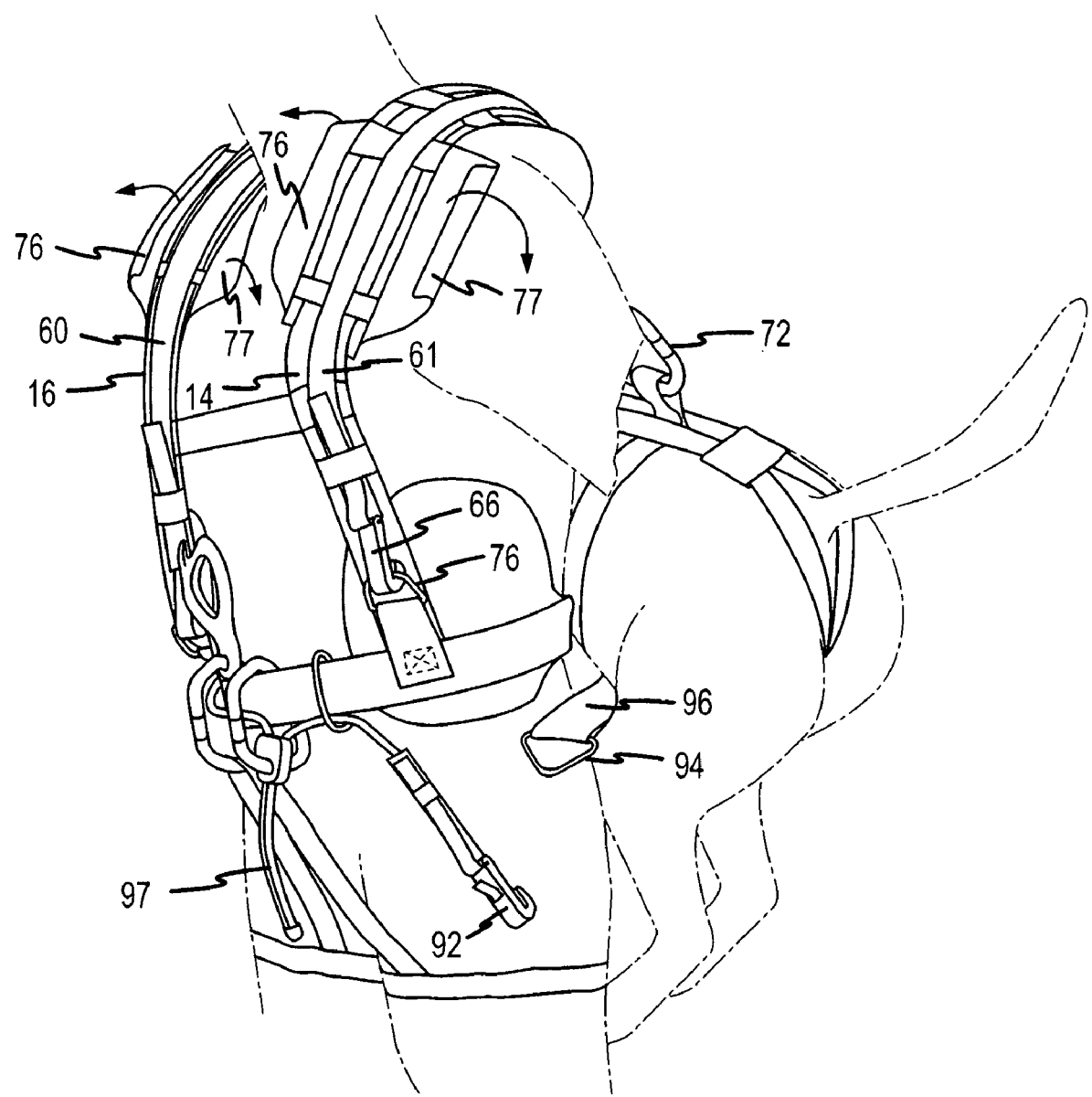
FIG. 11 is similar to FIG. 9 but showing the next step in disconnecting the dog from the handler, namely opening the flaps that comprise the sleeve pocket retainers for the risers that are part of the upper coupling assembly.
Figure 12:
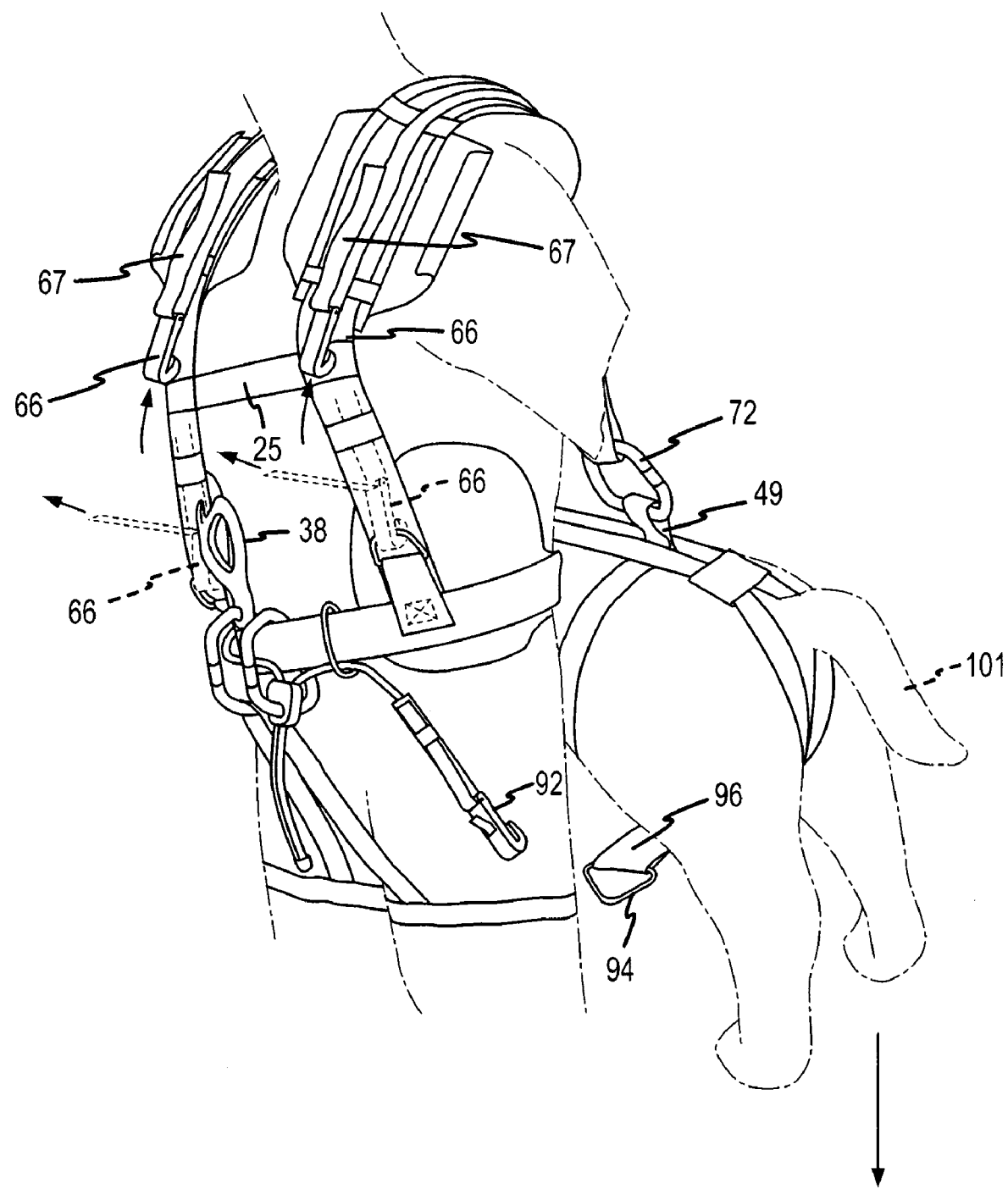
FIG. 12 is similar to FIG. 11 but showing the final step in disconnecting the dog from the handler, that is, unlatching the anterior snap connectors that fasten the riser straps to the waist belt of the handler's harness in order to fully release the last two of the four connecting points between the human harness and the canine harness.

Once off rappel the handler kneels or sits and first opens the easily accessible alligator clips 92 and 93 that are in series with the cinching connectors to release those connectors from the canine harness, as shown in FIG. 10. The handler then opens the riser retainer sleeve pockets 75 over his chest, as illustrated in FIG. 11. Next the handler yanks the pull handles 67 to open the quick ejector snaps 66 that attach the anterior riser ends to the front on the harness. The force of the dog's weight on the riser straps 60 and 61 pulls the tuck tab retainers 71 out of their engagement with the shoulder strap loops 24, completing the full release of the canine harness from attachment to the handler's harness. Once the canine harness is disconnected from the handler's harness the handler can then open the attaching carabiners 72, 98 and 99 that are connected to the four attachment points on the canine harness and remove from the dog's harness the risers and end portions 96 and 97 of the cinching connectors 81 and 82. The dog is now ready to carry out its tracking or search assignment wearing the canine harness which will not interfere with the dog's ability to run and move freely.

If it is necessary to recover the dog or the handler into the helicopter when their tasks on the ground are completed several options are available. The first is to attach a line to the back attachment loops 49 and 50 on the canine harness and hoist the dog aboard the helicopter. The second it to place the dog in front of the handler and attach the canine harness to the handler's harness and hoist the dog and handler together into the helicopter.

I claim:

1. A harness system for interconnecting canine and human members comprising,
a canine harness having interconnected back, belly and shoulder webbing members, and
a human harness having,
first releasable means interconnecting the human harness with the back webbing members of the canine harness, and
second releasable means interconnecting the human harness with the belly webbing members of the canine harness.

2. A system for detachably interconnecting canine and human beings comprising,
a canine harness having interconnected back, belly and shoulder webbing members,
a human harness having anterior and posterior portions, including shoulder straps and an interconnected waist belt,
an upper coupling assembly including,
a pair of flexible risers removably disposed over the respective shoulder straps, each riser having,
anterior connector means for releasable attachment to the front of the body harness, and posterior connector means for releasable attachment to the canine harness, and a lower coupling assembly having flexible tension means slidably carried by the waist belt and including, connector means for releasable attachment to the canine harness.

3. The system of claim 2 where each of the shoulder straps of the human harness include, riser retainer means for limiting lateral movement of the riser comprising, an openable sleeve pocket carried by the anterior aspect of the shoulder strap and adapted to encircle a riser.

4. The system of claim 3 where the riser retainer means further comprises, a folded back stub end of the riser, a loop carried by the shoulder strap and adapted to confine the stub end of the riser.

5. The system of claim 2 where the upper coupling assembly further includes, a lateral stabilizer strap interconnecting the risers.

6. The system of claim 2 where the flexible tension means includes, two lengths of cord adapted to be disposed around the respective waist sides of the human, and locking means slidably carrying the two lengths of cord for locking the cord lengths in a fixed position relative to the locking means.

7. The system of claim 2 where the canine harness includes, a plurality of attachment loops, including a withers loop and the rump loop fastened to the back webbing members of the harness.

8. A method of attaching a dog to a human for rappelling activity including, providing a human harness, providing a canine harness, interconnecting the human and canine harnesses with at least four connectors that are detachable from the human harness, where two of the four connectors pass over the human shoulders and attach to connecting point on the back of the canine harness.

9. The method of claim 8 and including the step of attaching two of the four connectors to connecting points on the belly side of the canine harness where the said belly connectors pass around the respective waist sides of the human handler.

10. The method of claim 9 and including the steps of shortening the two belly connectors and locking them into the shortened condition.

* * * * *